United States Patent
Quan

(10) Patent No.: US 8,270,713 B2
(45) Date of Patent: Sep. 18, 2012

(54) METHOD AND APPARATUS PROVIDING HARDWARE-EFFICIENT DEMOSAICING OF IMAGE DATA

(75) Inventor: Shuxue Quan, San Diego, CA (US)

(73) Assignee: Aptina Imaging Corporation, George Town (KY)

( * ) Notice: Subject to any disclaimer, the term of this patent is extended or adjusted under 35 U.S.C. 154(b) by 1167 days.

(21) Appl. No.: 12/118,619

(22) Filed: May 9, 2008

(65) Prior Publication Data

US 2009/0097743 A1    Apr. 16, 2009

Related U.S. Application Data

(63) Continuation-in-part of application No. 11/873,123, filed on Oct. 16, 2007, now Pat. No. 7,859,580, and a continuation-in-part of application No. 12/025,926, filed on Feb. 5, 2008.

(51) Int. Cl.
*G06K 9/00* (2006.01)

(52) U.S. Cl. .................................... 382/167; 382/300

(58) Field of Classification Search .................. 382/162, 382/167, 300
See application file for complete search history.

(56) References Cited

U.S. PATENT DOCUMENTS

| | | | |
|---|---|---|---|
| 3,971,065 A | 7/1976 | Bayer | |
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,404,918 B1 | 6/2002 | Hel-or et al. | |
| 6,563,538 B1 * | 5/2003 | Utagawa | 348/273 |
| 6,989,862 B2 | 1/2006 | Baharav et al. | |
| 7,088,392 B2 | 8/2006 | Kakarala et al. | |
| 7,155,066 B2 | 12/2006 | Baharav et al. | |
| 7,158,685 B2 | 1/2007 | Guenter | |
| 7,577,315 B2 * | 8/2009 | Uvarov et al. | 382/300 |
| 2004/0218073 A1 * | 11/2004 | Kalevo et al. | 348/272 |
| 2005/0169521 A1 | 8/2005 | Hel-Or et al. | |
| 2006/0038891 A1 | 2/2006 | Okutomi et al. | |
| 2006/0279585 A1 | 12/2006 | Milanfar et al. | |
| 2007/0153106 A1 | 7/2007 | Subbotin | |

FOREIGN PATENT DOCUMENTS

WO    WO 2004/034316    4/2004

OTHER PUBLICATIONS

Yacov Hel-Or and Daniel Keren, Demosaicing of Color Images Using Steerable Wavelets, available at http://www.hpl.hp.com/techreports/2002/HPL-2002-206R1.pdf.

* cited by examiner

*Primary Examiner* — Phuoc Tran

(57) ABSTRACT

A method and apparatus for determining missing color pixel values in image data (i.e., for demosaicing image data) using a small number of lines in a buffer memory. Pixel values are interpolated in a horizontal or a vertical direction based on gradient scores. Interpolation direction selection can be refined based on a chroma scores or morphological operations. A chroma blurring technique to reduce false color artifacts is also disclosed. A disclosed embodiment can be implemented in an imager having as few as three buffer lines.

8 Claims, 14 Drawing Sheets

|     | r-2 | r-1 | r | r+1 | r+2 |
|-----|-----|-----|---|-----|-----|
| c+2 | B | G | B | G | B |
| c+1 | G | R | G | R | G |
| c   | B | G | B | G | B |
| c-1 | G | R | G | R | G |
| c-2 | B | G | B | G | B |

|     | r-2 | r-1 | r | r+1 | r+2 |
|-----|-----|-----|---|-----|-----|
| c+2 | B | G | B | G | B |
| c+1 | G | R | G | R | G |
| c   | B | G | B | G | B |
| c-1 | G | R | G | R | G |
| c-2 | B | G | B | G | B |

FIG. 12

METHOD AND APPARATUS PROVIDING HARDWARE-EFFICIENT DEMOSAICING OF IMAGE DATA

CROSS-REFERENCE TO RELATED APPLICATIONS

This application is a continuation-in-part of U.S. application Ser. No. 11/873,123 filed Oct. 16, 2007, now U.S. Pat. No. 7,859,580 and a continuation-in-part of U.S. application Ser. No. 12/025,926 filed Feb. 5, 2008, the disclosures of which are incorporated herein by reference in their entirety.

FIELD OF THE INVENTION

The disclosed embodiments relate generally to digital imaging and, more particularly, to systems and methods for hardware-efficient demosaicing of image data.

BACKGROUND

Imagers typically consist of an array of thousands or even millions of pixel cells organized into rows and columns. Each pixel cell contains a photosensor (e.g., a photodiode) that is configured to produce an electrical signal corresponding to the intensity of light impinging on it when an image of a scene is focused on the array by one or more lenses. Each signal can be converted to a digital pixel value (i.e., a number associated with a pixel cell), usually with small numbers representing lower light intensity (i.e., darker areas of the scene) and larger numbers representing higher light intensity (i.e., brighter areas of the scene). A digital image can be formed by organizing the pixel values into rows and columns corresponding to the arrangement of their respective pixel cells in the pixel array. The digital image can be stored in a memory, displayed on a monitor, manipulated by software, printed, or otherwise used to provide information about the scene.

Several kinds of imagers are generally known. Complementary metal-oxide-semiconductor ("CMOS") imagers and charge coupled device ("CCD") imagers are among the most common. CMOS imagers are discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, all assigned to Micron Technology, Inc.

For an imager to capture a color image, its pixel cells must be able to separately detect values of colored light, for example, red (R) light, green (G) light, and blue (B) light. A color filter array is typically placed in front of the array of pixel cells so each pixel cell measures only light of the color of its respective filter. The most common type of color filter array, often referred to as a "Bayer color filter array," is described in U.S. Pat. No. 3,971,065. As shown in FIG. 2A, Bayer color filter arrays consist of alternating red (R) and green (G) filters in a first row and alternating green (G) and blue (B) filters in a second row. This pattern is repeated throughout the array. Thus, in an imager employing a Bayer color filter array, one-half of the pixel cells are sensitive to green light, one-quarter are sensitive to red light, and the remaining one-quarter are sensitive to blue light.

To provide a color image, however, red, green, and blue values are required for every pixel. Thus, the two "missing" color values at each pixel location must be estimated, usually by reference to other nearby pixel values. For example, the pixel at row r+1 and column c+1 in FIG. 2A is sensitive to red light, as indicated by the "R" within the pixel cell. Blue and green color values for this pixel can be estimated based on color values of nearby pixels. This estimation process is often referred to as "demosaicing."

Several demosaicing methods are known in the art. The simplest methods consider each color separately. For example, missing green pixel values are estimated based on nearby green pixel values. Bilinear interpolation is one such method and provides good results when applied to grayscale images. However, bilinear interpolation in color imaging often results in many visible artifacts (e.g., zipper effect or artificially colored or blurred edges).

Bilinear interpolation and other standard interpolation methods treat each color independently. However, color images often exhibit a high degree of correlation among color channels. Several methods have been proposed to use this correlation to more accurately estimate missing color pixel values. One such method involves analyzing pixels around each missing color pixel value to determine whether the region exhibits a preferred interpolation direction. For example, in one implementation, pixel values from to the left of a missing color pixel value are subtracted from pixel values to the right of the missing color pixel value to determine a horizontal gradient score. Similarly, a difference between pixel values above and below the mixing color pixel value is computed to determine a vertical gradient score. By comparing the scores, these "edge-directed" methods attempt to determine whether the missing color pixel value should be interpolated horizontally, vertically, or both. In general, the interpolation direction is chosen to interpolate along edges rather than across edges.

Wrongly selecting the interpolation direction is a major source of error in edge-directed demosaicing methods. For example, if interpolation direction changes abruptly along an edge, a zipper effect occurs. Similarly, if an interpolation direction in a region of an image is random or difficult to determine, color aliasing occurs. Thus, there is a need in the art for an improved demosaicing method that provides, among other things, more accurate interpolation direction selection. U.S. application Ser. No. 11/873,123 discloses systems and methods for demosaicing image data with more accurate interpolation direction selection.

After demosaicing, three or four color values are typically associated with each pixel, depending on the color space used by the imager or processing software. RGB and $YC_bC_r$ are two common color spaces. In the RGB color space, also referred to as the "Bayer domain," a red value (R), a blue value (B), and a green value (G) are associated with each pixel. In the $YC_bC_r$ color space, a luminance (i.e., brightness) value (Y) and two chrominance (i.e., color) values ($C_b$ and $C_r$) are associated with each pixel.

Sometimes demosaiced color pixel values do not accurately reflect the true color in a corresponding part of a scene. For example, a pixel corresponding to the edge of a white region in a scene might appear colored rather than white. Digital image processing can be used to correct such errors, which are also referred to as "color artifacts." Aliasing artifacts are one common kind of color artifact. Aliasing occurs when detail in a scene exceeds the sampling frequency of the imager, for example, when the lines of detail in an image exceed the number of rows of pixels in the pixel array of an imager. Aliasing can result in color artifacts along edges of details in an image and especially, though not exclusively, along edges involving an abrupt black-to-white transition. The tendency of lenses to refract different wavelengths of light differently is another common cause of color artifacts. Color artifacts may also appear as isolated colored "dots," sometimes comprising only a single wrongly-colored pixel, in an image. These isolated colored dots can be caused, for example, by a defect in the imager or an error during demosaicing.

Correcting the root causes of color artifacts requires additional hardware components or substitution of higher-quality hardware components, such as, for example, a pixel array with more pixels or lenses that refract varying wavelengths of light more evenly. These solutions are often impractical, particularly in low-cost imagers. Therefore, a less expensive method for reducing color artifacts in digital images, particularly one which does not require additional or higher-quality hardware, is desirable. U.S. application Ser. No. 12/025,926 discloses such systems and methods for reducing color artifacts in digital images.

While the '123 and '926 applications disclose systems and methods for improved demosaicing and color artifact reduction, there remains a perpetual demand for even more hardware-efficient solutions.

BRIEF DESCRIPTION OF THE DRAWINGS

FIG. 2A illustrates a portion of a pixel array and the relative locations of pixels used to determine a horizontal gradient score in accordance with a disclosed embodiment.

FIG. 2B illustrates a portion of a pixel array and the relative locations of pixels used to determine a vertical gradient score in accordance with a disclosed embodiment.

FIG. 3A illustrates a portion of a pixel array and the relative locations of pixels used to determine a horizontal chroma score in accordance with a disclosed embodiment.

FIG. 3B illustrates a portion of a pixel array and the relative locations of pixels used to determine a vertical chroma score in accordance with a disclosed embodiment.

FIG. 4 illustrates a portion of a pixel array and the relative locations of pixels used in morphological operations in accordance with a disclosed embodiment.

FIGS. 5A, 5B, and 5C illustrate a portion of a pixel array and the relative locations of pixels used to estimate a missing green pixel value for a red or blue pixel in accordance with a disclosed embodiment.

FIGS. 6A, 6B, and 6C illustrate a portion of a pixel array and the relative locations of pixels used to estimate a missing blue pixel value for a red pixel in accordance with a disclosed embodiment.

FIGS. 7A, 7B, and 7C illustrate a portion of a pixel array and the relative locations of pixels used to estimate a missing red pixel value for a blue pixel in accordance with a disclosed embodiment.

FIGS. 8A and 8B illustrate a portion of a pixel array and the relative locations of pixels used to estimate a missing red pixel value for a green pixel in a row with red and green pixels in accordance with a disclosed embodiment.

FIGS. 9A, 9B, and 9C illustrate a portion of a pixel array and the relative locations of pixels used to estimate a missing blue pixel value for a green pixel in a row with red and green pixels in accordance with a disclosed embodiment.

FIGS. 10A, 10B, and 10C illustrate a portion of a pixel array and the relative locations of pixels used to estimate a missing red pixel value for a green pixel in a row with blue and green pixels in accordance with a disclosed embodiment.

FIGS. 11A and 11B illustrate a portion of a pixel array and the relative locations of pixels used to estimate a missing blue pixel value for a green pixel in a row with blue and green pixels in accordance with a disclosed embodiment.

FIG. 12 illustrates a portion of a pixel array and the relative locations of pixels used to implement chroma blurring in accordance with a disclosed embodiment.

DETAILED DESCRIPTION OF THE DISCLOSED EMBODIMENTS

Figure 1:
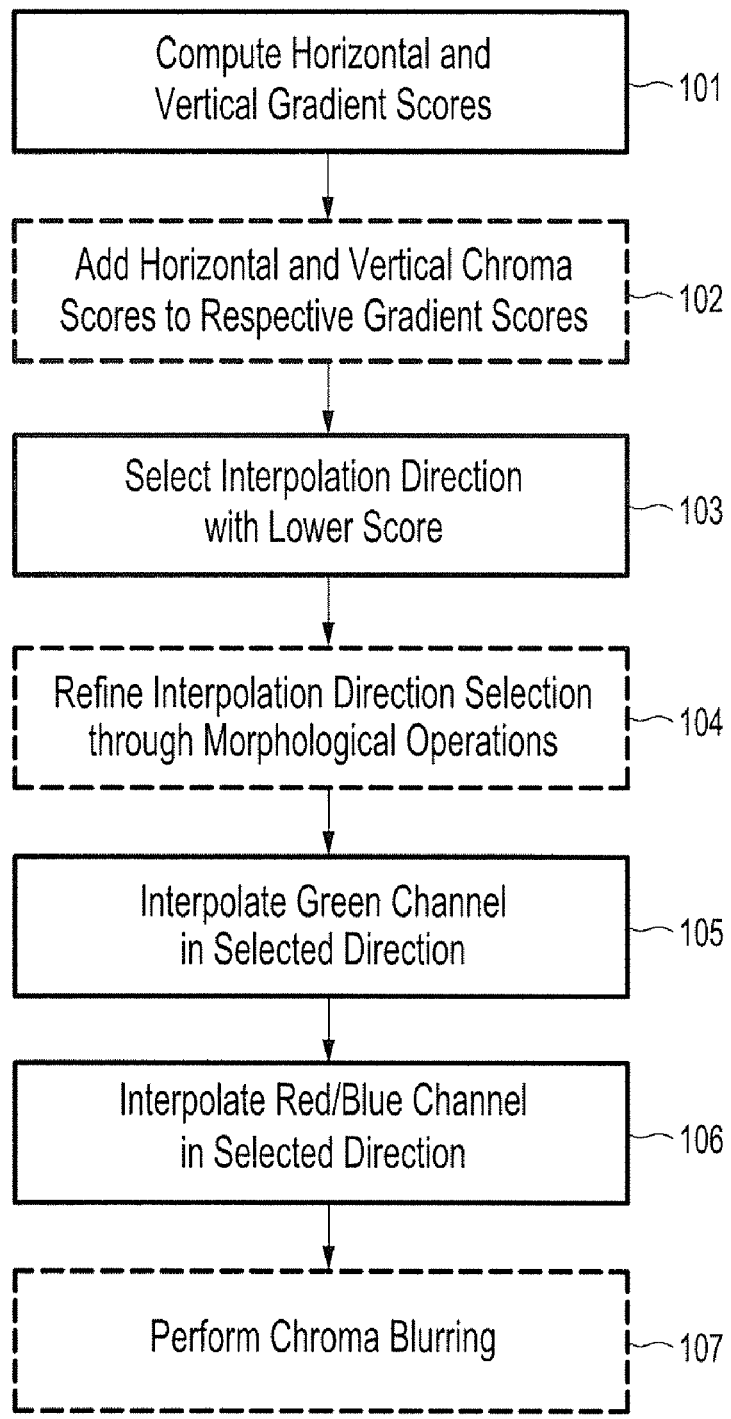
FIG. 1 is a flowchart illustrating a method in accordance with a disclosed embodiment.

In the following detailed description, reference is made to the accompanying drawings, which form a part hereof and show by way of illustration specific embodiments of the invention. These embodiments are described in sufficient detail to enable those skilled in the art to practice them, and it is to be understood that the disclosed embodiments may be modified and that other embodiments may be utilized. Moreover, the progression of steps described herein is merely one example, and it should be noted that the sequence of steps is not limited to that set forth herein and may be changed or reordered, with the exception of steps necessarily occurring in a certain order.

Embodiments described herein are more hardware-efficient than the embodiments described in the '123 and '926 applications. Embodiments described herein can be implemented using a three-line buffer for holding pixel data during the processing operations described.

Throughout the detailed description below, the term "red pixel" is used to refer to a pixel cell associated with a red portion of a color filter array. In other words, "red pixel" refers to a pixel cell that is configured to directly measure incident red light. Similarly, the terms "green pixel" and "blue pixel" are used to refer to pixel cells associated with green and blue portions of a color filter array, respectively. After demosaicing, however, several color values may be associated with each pixel cell. The term "pixel value" is used to refer to a color value associated with a pixel cell, regardless of whether the color value was directly measured by the pixel cell or estimated during demosaicing. For example, in a typical imager fitted with a Bayer color filter array, a red pixel value, a green pixel value, and a blue pixel value would be associated with every pixel cell after demosaicing.

In the formulas and detailed description below, the notation $R_{(r,c)}$ is used to refer to the red pixel value associated with the pixel cell at row r and column c of a pixel array. Similarly, the notations $G_{(r,c)}$ and $B_{(r,c)}$ are used to refer to green and blue pixel values, respectively, associated with the pixel cell at row r and column c of a pixel array. These pixel values may be measured directly by a pixel cell (e.g., a red pixel value for a pixel cell associated with a red portion of a color filter array) or demosaiced color pixel values (e.g., a blue pixel value for a pixel cell associated with a red portion of a color filter array). Sometimes an offset (e.g., −1 or +1) appears in the row and column subscript. This offset refers to a pixel cell at a location relative to the pixel cell at row r and column c of a pixel array. For example, $R_{(r,c-1)}$ refers to the red pixel value of the pixel cell in the same row but adjacent column (e.g., left column) as the pixel cell at row r and column c of a pixel array. Similarly, $R_{(r,c+1)}$ refers to the red pixel value of the pixel cell in the same row but adjacent column in the opposite direction (e.g., right column). Relative pixel locations referred to in the formulas below are illustrated in the accompanying drawings.

FIG. 1 is a flowchart of a method in accordance with an embodiment disclosed herein. Optional steps are indicated by dashed boxes. The method includes determining whether to interpolate a missing pixel value (e.g., a missing green pixel value for a red pixel) in a horizontal or vertical direction at step 103 based on gradient scores computed at step 101 and, optionally, chroma scores computed at step 102. Morphological operations, described in greater detail below, can optionally be used at step 104 to refine the interpolation direction selected at step 103. Missing green pixel values are interpolated in the selected direction at step 105. Missing red and blue pixel values are interpolated at step 106. Optional chroma blurring can be employed at step 107 to reduce color artifacts.

To reduce image artifacts, the interpolation direction for each missing pixel value must be carefully determined. For example and with reference to FIG. 2A, an embodiment might begin by determining whether the missing green pixel value for the red pixel at row r+1 and column c+1 (indicated by crisscrossed shading) should be interpolated horizontally or vertically. Edge directionality can be detected by computing and comparing the horizontal and vertical gradient scores computed at step 101 of FIG. 1. In general, missing pixel color values for a pixel are preferably interpolated along, rather than across, nearby edges.

The horizontal gradient score for a red pixel at row r+1 and column c+1, denoted $D_{h_{(r+1,c+1)}}$, can be computed as follows:

$$D_{h_{(r+1,c+1)}} = |B_{(r,c)} - B_{(r,c+2)}| + |B_{(r+2,c)} - B_{(r+2,c+2)}| + |G_{(r+1,c)} - G_{(r+1,c+2)}| \quad (1)$$

Figures 2A, 2B:
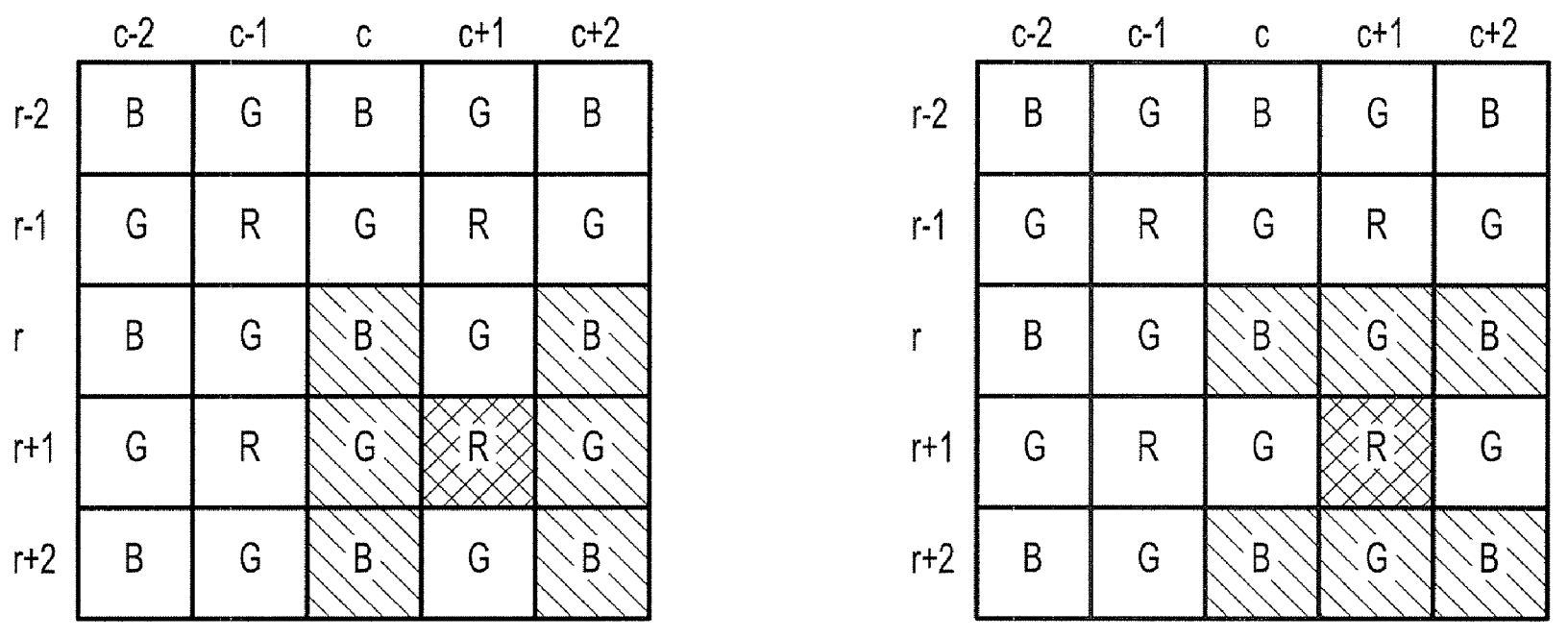

The pixel values referenced in formula (1) are illustrated by FIG. 2A. The pixel at row r+1 and column c+1 for which the horizontal gradient score is computed, denoted herein as the "subject" pixel, is shaded with crisscrossed lines. The pixels whose values are referenced are shaded with diagonal lines.

The vertical gradient score for the red pixel at row r+1 and column c+1, denoted $D_{v_{(r+1,c+1)}}$, can be computed as follows:

$$D_{v_{(r+1,c+1)}} = |B_{(r,c)} - B_{(r+2,c)}| + |B_{(r+2,c+2)}| + |G_{(r,c+1)} - G_{(r+2,c+1)}| \quad (2)$$

Pixel values referenced in formula (2) are illustrated by FIG. 2B.

At step 103 of FIG. 1, the horizontal and vertical gradient scores, $D_h$ and $D_v$, respectively, are compared to determine an interpolation direction. In general, a missing color pixel value is interpolated in the direction having a lower gradient score. For example, if $D_h < D_v$, then the missing color pixel value would be interpolated horizontally.

The interpolation direction selection can be enhanced by considering differences in pixel values across color channels. For example, gradient scores alone may be unable to reliably determine an interpolation direction in areas of the image where pixel values change rapidly. By comparing pixel values across color channels, an interpolation direction can be selected such that the local chroma (i.e., the local color values) remains substantially uniform, thereby reducing coloration in the interpolated image. The differences across color channels can be quantified by computing horizontal and vertical chroma scores at optional step 102, if desired.

The horizontal and vertical chroma scores for a pixel at row r+1 and column c+1, denoted $K_{h_{(r+1,c+1)}}$ and $K_{v_{(r+1,c+1)}}$, respectively, can be computed as follows:

$$K_{h_{(r+1,c+1)}} = \left| \frac{G_{(r+1,c+2)} + G_{(r+1,c)}}{2} - R_{(r+1,c+1)} \right| \quad (3)$$

$$K_{v_{(r+1,c+1)}} = \left| \frac{G_{(r+2,c+1)} + G_{(r,c+1)}}{2} - R_{(r+1,c+1)} \right| \quad (4)$$

Figures 3A, 3B:
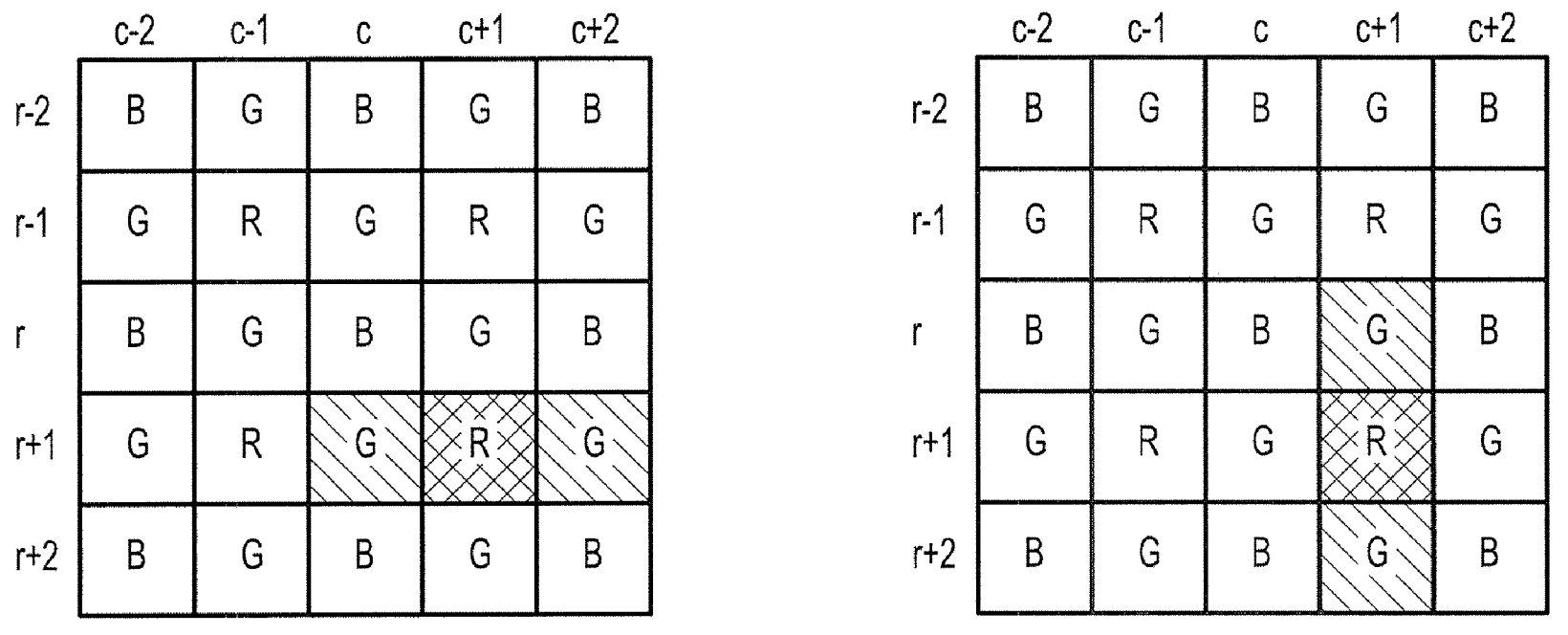

Pixel values referenced in formulas (3) and (4) are illustrated by FIGS. 3A and 3B, respectively. Consistent with the shading described previously and used throughout this disclosure, the subject pixel is shaded with a crisscross pattern and the referenced pixels are shaded with diagonal lines.

Gradient scores and chroma scores can be combined as follows:

$$D'_{h_{(r+1,c+1)}} = D_{h_{(r+1,c+1)}} + K_{h_{(r+1,c+1)}} \quad (5)$$

$$D'_{v_{(r+1,c+1)}} = D_{v_{(r+1,c+1)}} + K_{v_{(r+1,c+1)}} \quad (6)$$

At step 103, $D'_{h_{(r+1,c+1)}}$ and $D'_{v_{(r+1,c+1)}}$ can be compared to determine an interpolation direction. As described above, a missing color pixel value is generally interpolated in the direction having a lower gradient score. For example, if $D'_h < D'_v$, then the missing color pixel value would be interpolated horizontally.

At step 104, small regions in which the interpolation direction has been erroneously selected can be mitigated through morphological operations, sometimes called "digital filtering." One possible digital filtering scheme compares the interpolation direction of a subject pixel with the interpolation direction of neighboring pixels. If a threshold number of neighboring pixels share a common interpolation direction, then the interpolation direction of the subject pixel is selected to match the interpolation direction of the neighboring pixels. In a disclosed embodiment, the interpolation direction of the two nearest pixels of the same color and in the same row as the subject pixel are compared. If the two nearest pixels share a common interpolation direction (e.g., horizontal), then the interpolation direction is set to that same interpolation direction. Otherwise, the interpolation direction of the subject pixel is left unchanged.

Digital filtering can be implemented by means of a binary map. For each pixel, assign a value of 1 if the pixel's horizontal score is less than or equal to the pixel's vertical score; otherwise, a value of 0 is assigned. In other words, assign a value $M_{(r,c)}$ associated with a subject pixel at row r and column c as follows:

$$M_{(r,c)} = \begin{cases} 1 & \text{if } D_{h_{(r,c)}} \leq D_{v_{(r,c)}} \\ 0 & \text{if } D_{h_{(r,c)}} > D_{v_{(r,c)}} \end{cases} \quad (7)$$

The binary value associated with the subject pixel, $M_{(r,c)}$, can be refined based on the binary values associated with neighboring pixels as follows:

$$M'_{(r,c)} = \begin{cases} M_{(r,c-2)} & \text{if } M_{(r,c-2)} = M_{(r,c+2)} \\ M_{(r,c)} & \text{if } M_{(r,c-2)} \neq M_{(r,c+2)} \end{cases} \quad (8)$$

Figure 4:
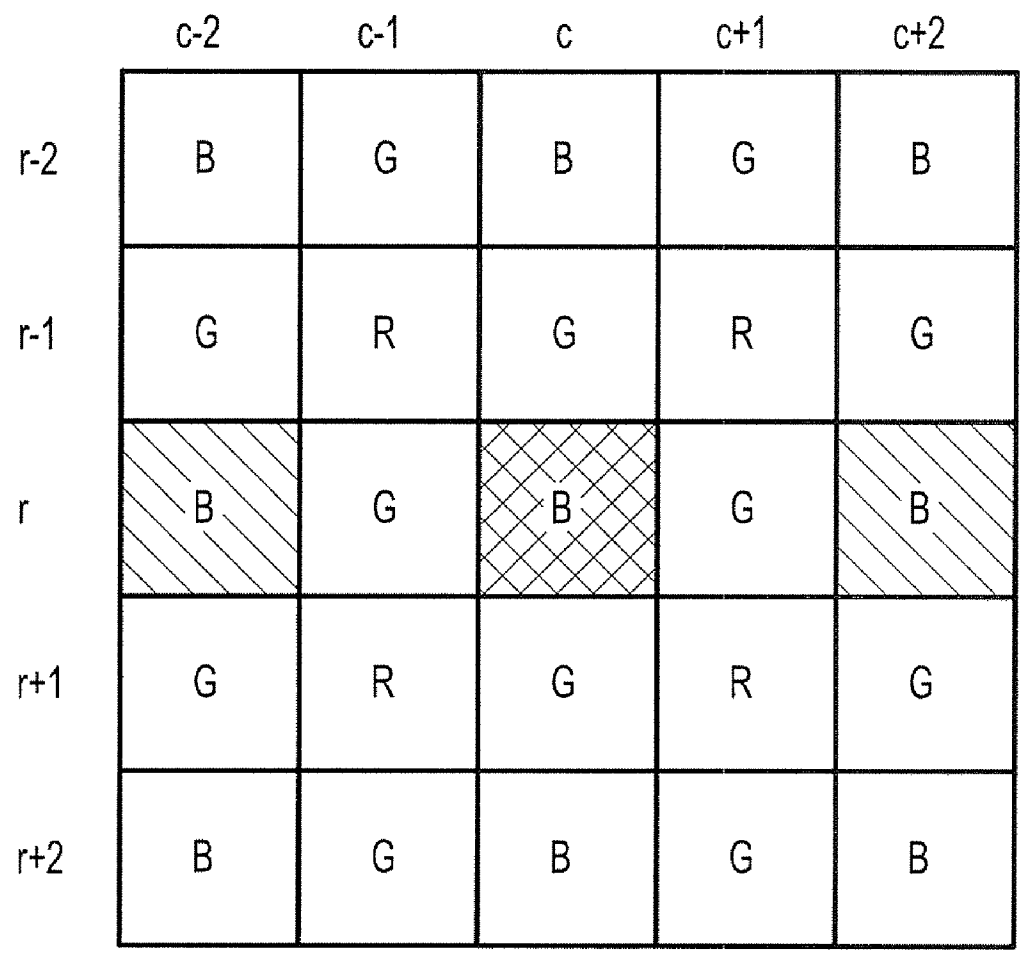

The relative locations of pixels referenced in formula (8) are illustrated in FIG. 4. The subject pixel at row r and column c is shaded with a crisscross pattern. The two neighboring pixels whose interpolation directions are compared are shaded with diagonal lines.

The refined binary value M' associated with each pixel corresponds to an interpolation direction. $M'_{(r,c)} = 1$ corresponds to a horizontal interpolation direction and $M'_{(r,c)} = 0$ corresponds to a vertical interpolation direction.

Once the interpolation direction for a pixel has been determined, the missing green value associated with that pixel can be interpolated at step 105. According to a disclosed embodiment and with reference to FIGS. 5A, 5B, and 5C, the missing green pixel value associated with the red pixel at row r+1 and column c+1 can be interpolated as follows:

$$G_{(r+1,c+1)} = \begin{cases} \frac{G_{(r+1,c)} + G_{(r+1,c+2)}}{2} & \text{if } D_{h_{(r+1,c+1)}} < D_{v_{(r+1,c+1)}} \\ \frac{G_{(r,c+1)} + G_{(r+2,c+1)}}{2} & \text{if } D_{h_{(r+1,c+1)}} > D_{v_{(r+1,c+1)}} \\ \frac{G_{(r+1,c)} + G_{(r+1,c+2)} + G_{(r,c+1)} + G_{(r+2,c+1)}}{4} & \text{if } D_{h_{(r+1,c+1)}} = D_{v_{(r+1,c+1)}} \end{cases} \quad (9)$$

Figures 5A, 5B, 5C:
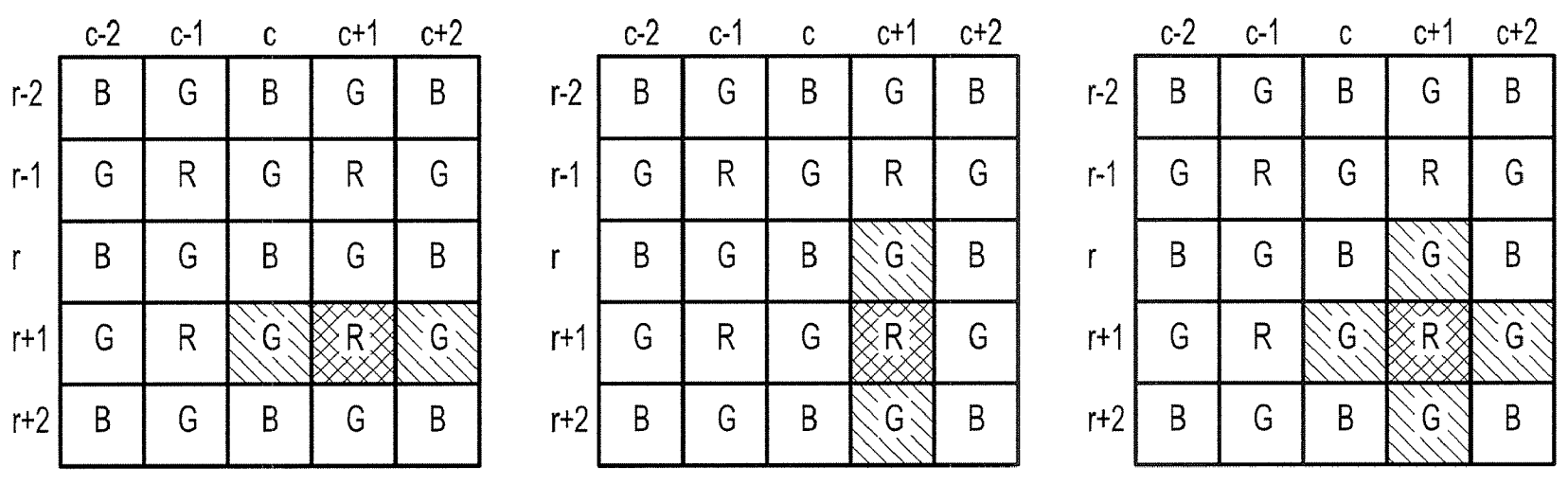

In the first case, where $D_{h_{(r+1,c+1)}} < D_{v_{(r+1,c+1)}}$ (i.e., where the horizontal score is less than the vertical score), the missing green pixel value is interpolated horizontally, as illustrated in FIG. 5A. In the second case, where $D_{h_{(r+1,c+1)}} > D_{v_{(r+1,c+1)}}$ (i.e., where the horizontal score is greater than the vertical score), the missing green pixel value is interpolated vertically, as illustrated in FIG. 5B. In the third case, where $D_{h_{(r+1,c+1)}} = D_{v_{(r+1,c+1)}}$ (i.e., where the horizontal score is equal to the vertical score), the missing green pixel value is interpolated using a hybrid horizontal and vertical scheme, as illustrated in FIG. 5C. Note that the $D_h$ and $D_v$ values can include only horizontal and vertical gradient scores, respectively, but may also include optional horizontal and vertical chroma scores, respectively. As described above, the interpolation direction selection can be refined through digital filtering operations.

Although, in the example provided above in formula (9) and illustrated in FIGS. 5A, 5B, and 5C, a red pixel is located at row r+1 and column c+1, the same technique can be used to interpolate missing green values associated with blue pixels. For example and with reference to FIG. 5A, the pixel references could be translated to estimate a green value for the blue pixel at row r and column c as follows:

$$G_{(r,c)} = \begin{cases} \frac{G_{(r,c-1)} + G_{(r,c+1)}}{2} & \text{if } D_{h_{(r,c)}} < D_{v_{(r,c)}} \\ \frac{G_{(r-1,c)} + G_{(r+1,c)}}{2} & \text{if } D_{h_{(r,c)}} > D_{v_{(r,c)}} \\ \frac{G_{(r,c-1)} + G_{(r,c+1)} + G_{(r-1,c)} + G_{(r+1,c)}}{4} & \text{if } D_{h_{(r,c)}} = D_{v_{(r,c)}} \end{cases} \quad (10)$$

Once the green channel has been interpolated (i.e., once missing green values have been estimated), missing red and blue pixel values can be interpolated by exploiting interchannel correlation at step 106. In other words, missing red and blue pixel values can be estimated based at least in part on the interpolated green values. Assuming operation in the Bayer domain, a red value remains to be interpolated for each blue pixel and a blue value remains to be interpolated for each red pixel. Both red and blue values remain to be interpolated for green pixels.

As with green estimation above, red and blue values can be interpolated horizontally or vertically. In a disclosed embodiment, a missing red value at a blue pixel (or a missing blue value at a red pixel) is interpolated in the same direction as the missing green value at the pixel. For example, if a missing green value for a red pixel was interpolated vertically, then the missing blue pixel value for that red pixel would also be interpolated vertically.

Figures 6A, 6B, 6C:
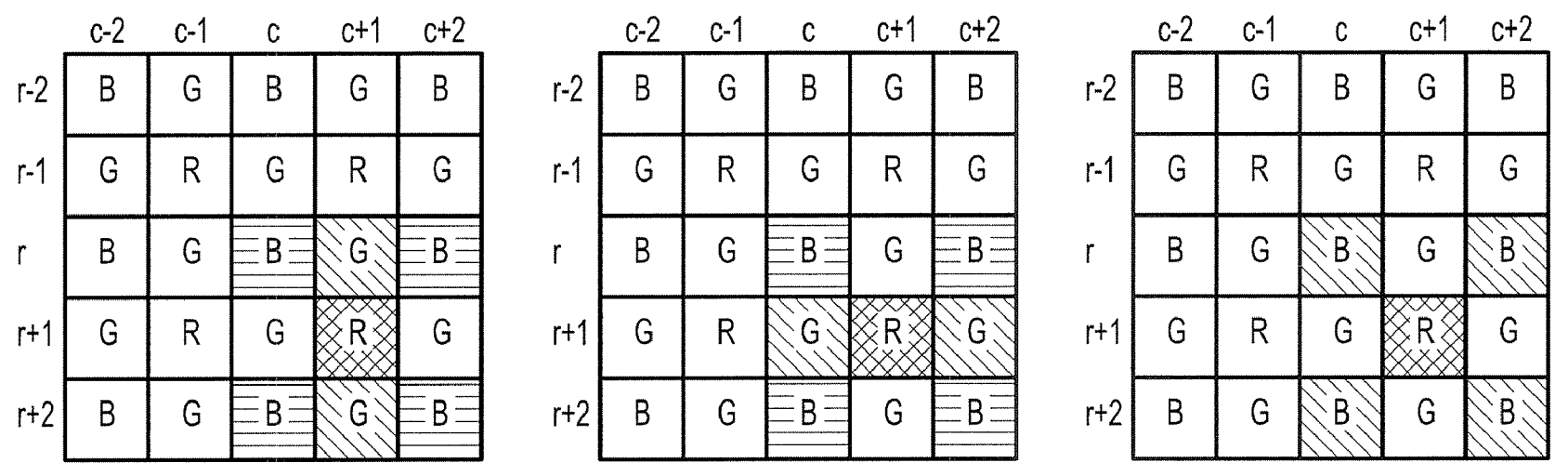

With reference to FIG. 6A, a missing blue value for a red pixel located at row r+1 and column c+1, $B_{(r+1,c+1)}$, can be interpolated in the horizontal direction as follows:

$$B'_{(r,c+1)} = \frac{B_{(r,c)} + B_{(r,c+2)}}{2} \quad (11)$$

$$B'_{(r+2,c+1)} = \frac{B_{(r+2,c)} + B_{(r+2,c+2)}}{2} \quad (12)$$

$$B_{(r+1,c+1)} = G_{(r+1,c+1)} + \frac{B'_{(r,c+1)} - G_{(r,c+1)} + B'_{(r+2,c+1)} - G_{(r+2,c+1)}}{2} \quad (13)$$

$B'_{(r,c+1)}$ and $B'_{(r+2,c+1)}$ are intermediate values and can be discarded after the interpolated blue value $B_{(r+1,c+1)}$ is computed. In FIG. 6A, the subject pixel at row r+1 and column c+1 is shaded with a crisscross pattern, the adjacent pixels for which intermediate blue values are computed are shaded with diagonal lines, and the pixels referenced in computing the intermediate values are shaded with horizontal lines.

With reference to FIG. 6B, a missing blue value for a red pixel located at row r+1 and column c+1, $B_{(r+1,c+1)}$, can be interpolated in the vertical direction as follows:

$$B'_{(r+1,c)} = \frac{B_{(r,c)} + B_{(r+2,c)}}{2} \quad (14)$$

$$B'_{(r+1,c+2)} = \frac{B_{(r,c+2)} + B_{(r+2,c+2)}}{2} \quad (15)$$

$$B_{(r+1,c+1)} = G_{(r+1,c+1)} + \frac{B'_{(r+1,c)} - G_{(r+1,c)} + B'_{(r+1,c+2)} - G_{(r+1,c+2)}}{2} \quad (16)$$

Missing green values are sometimes interpolated using a hybrid horizontal and vertical scheme, as described above with reference to FIG. 5C. In this case and with reference to FIG. 6C, a missing blue value for the red pixel at row r+1 and column c+1, $B_{(r+1,c+1)}$, can also be interpolated with a hybrid approach as follows:

$$B_{(r+1,c+1)} = \frac{B_{(r,c)} + B_{(r,c+2)} + B_{(r+2,c)} + B_{(r+2,c+2)}}{4} \quad (17)$$

Figures 7A, 7B, 7C:
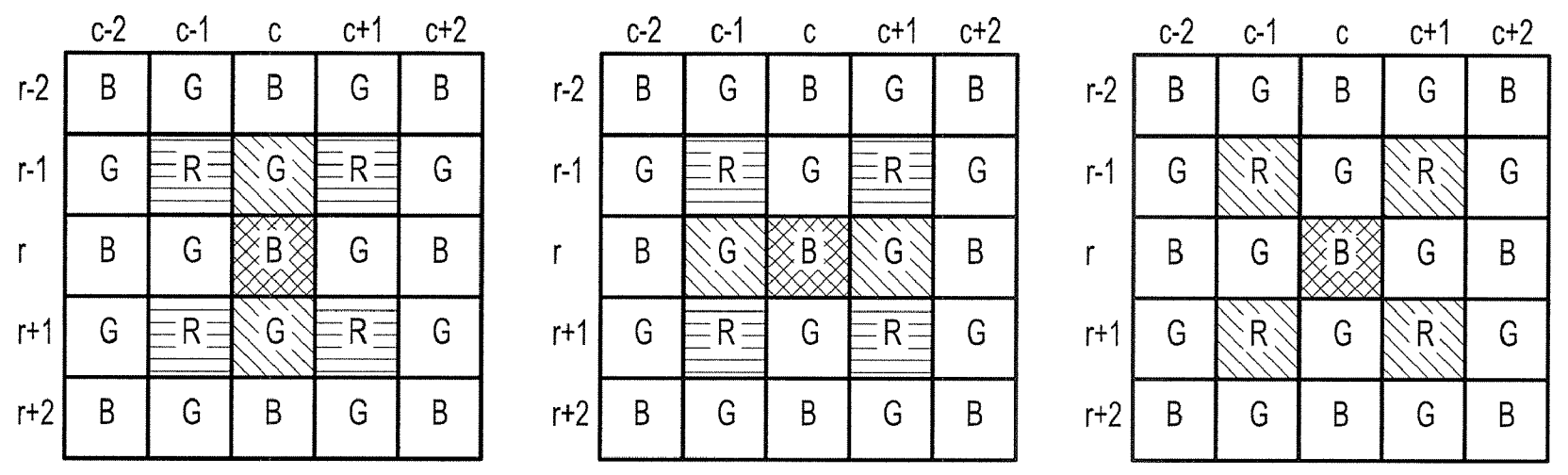

With reference to FIG. 7A, a missing red value for a blue pixel located at row r and column c, $R_{(r,c)}$, can be interpolated in the horizontal direction as follows:

$$R'_{(r-1,c)} = \frac{R_{(r-1,c-1)} + R_{(r-1,c+1)}}{2} \quad (18)$$

$$R'_{(r+1,c)} = \frac{R_{(r+1,c-1)} + R_{(r+1,c+1)}}{2} \quad (19)$$

$$R_{(r,c)} = G_{(r,c)} + \frac{R'_{(r-1,c)} - G_{(r-1,c)} + R'_{(r+1,c)} - G_{(r+1,c)}}{2} \quad (20)$$

With reference to FIG. 7B, a missing red value for a blue pixel located at row r and column c, $R_{(r,c)}$, can be interpolated in the vertical direction as follows:

$$R'_{(r,c-1)} = \frac{R_{(r-1,c-1)} + R_{(r+1,c-1)}}{2} \quad (21)$$

$$R'_{(r,c+1)} = \frac{R_{(r-1,c+1)} + R_{(r+1,c+1)}}{2} \quad (22)$$

$$R_{(r,c)} = G_{(r,c)} + \frac{R'_{(r,c-1)} - G_{(r,c-1)} + R'_{(r,c+1)} - G_{(r,c+1)}}{2} \quad (23)$$

With reference to FIG. 7C, a missing red value for the blue pixel at row r and column c, $R_{(r,c)}$, can be interpolated with a hybrid approach as follows:

$$R_{(r,c)} = \frac{R_{(r-1,c-1)} + R_{(r-1,c+1)} + R_{(r+1,c-1)} + R_{(r+1,c+1)}}{4} \quad (24)$$

Assuming operation in the Bayer domain, both red and blue values remain to be interpolated for green pixels. The interpolation direction selection rule described above—interpolate red or blue in the same direction as green—is not helpful since no green value need be estimated for a green pixel. According to a disclosed embodiment, the interpolation direction for red and blue values at green pixels is determined with reference to the immediately adjacent red or blue pixels in the same row as the subject green pixel. If green values for both adjacent pixels were interpolated horizontally, then red and blue values for the subject green pixel are also interpolated horizontally. Likewise, if green values for both adjacent pixels were interpolated vertically, then red and blue values for the subject green pixel are also interpolated vertically. If the green value of one adjacent pixel was interpolated horizontally and the green value of the other adjacent pixel was interpolated vertically, then red and blue values for the subject green pixel are interpolated using a hybrid horizontal and vertical scheme.

Figures 8A, 8B:
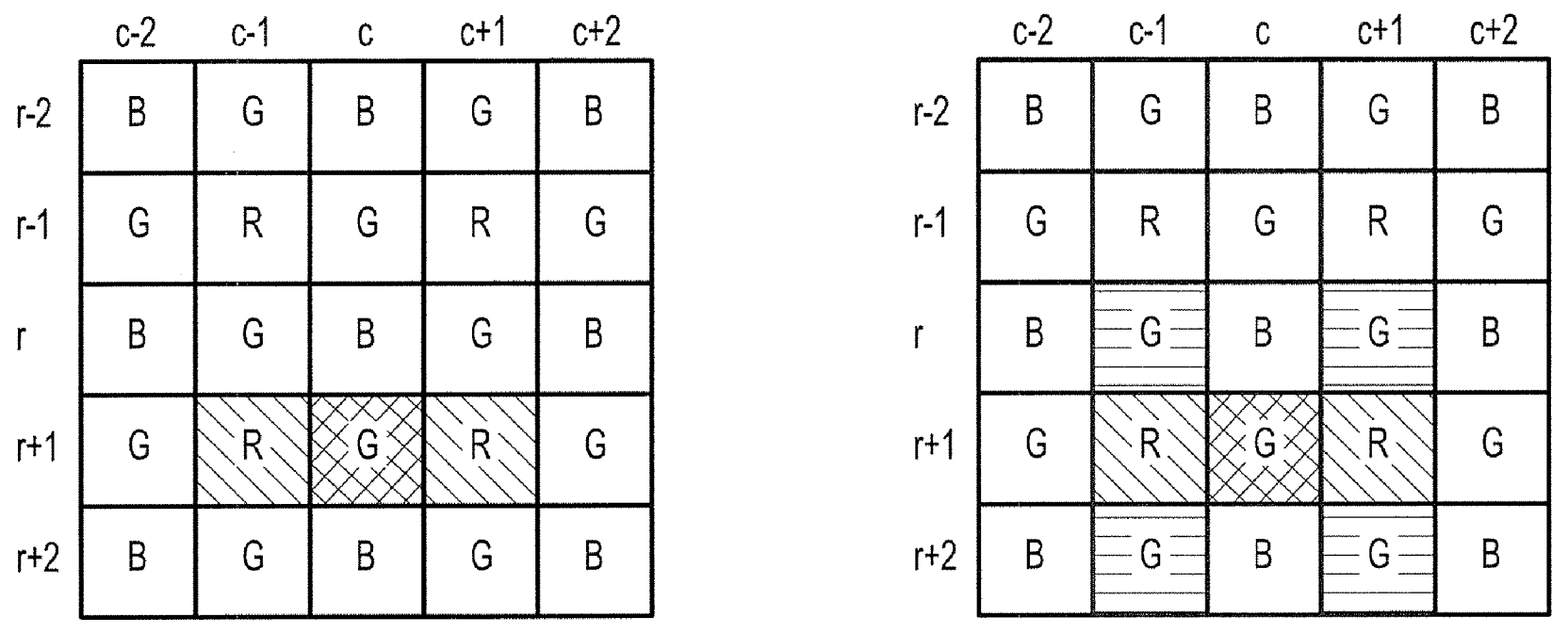

For example and with reference to FIG. 8A, the interpolation direction for red and blue values for the green pixel at row r+1 and column c would be determined with reference to the red pixels in the same row r+1 and columns c−1 and c+1. If, for example, the green values associated with these red pixels were both interpolated horizontally, then the red and blue values for the subject green pixel would also be interpolated horizontally.

With reference to FIG. 8A, a missing red value for a green pixel in a row comprising red and green pixels and located at row r+1 and column c, $R_{(r+1,c)}$, can be interpolated in the horizontal direction as follows:

$$R_{(r+1,c)} = \frac{R_{(r+1,c-1)} + R_{(r+1,c+1)}}{2} \quad (25)$$

With reference to FIG. 8B, a missing red value for a green pixel in a row comprising red and green pixels and located at row r+1 and column c, $R_{(r+1,c)}$, can be interpolated in the vertical direction as follows:

$$G'_{(r+1,c-1)} = \frac{G_{(r,c-1)} + G_{(r+2,c-1)}}{2} \quad (26)$$

$$G'_{(r+1,c+1)} = \frac{G_{(r,c+1)} + G_{(r+2,c+1)}}{2} \quad (27)$$

$$R_{(r+1,c)} = G_{(r+1,c)} + \frac{R_{(r+1,c-1)} - G'_{(r+1,c-1)} + R_{(r+1,c+1)} - G'_{(r+1,c+1)}}{2} \quad (28)$$

When a red value of a green pixel in a row comprising red and green pixels is to be interpolated in a hybrid horizontal and vertical direction (i.e., when the neighbors of the subject green pixel are interpolated in different directions), the red value can be interpolated according to formulas (26), (27), and (28) above.

Figures 9A, 9B, 9C:
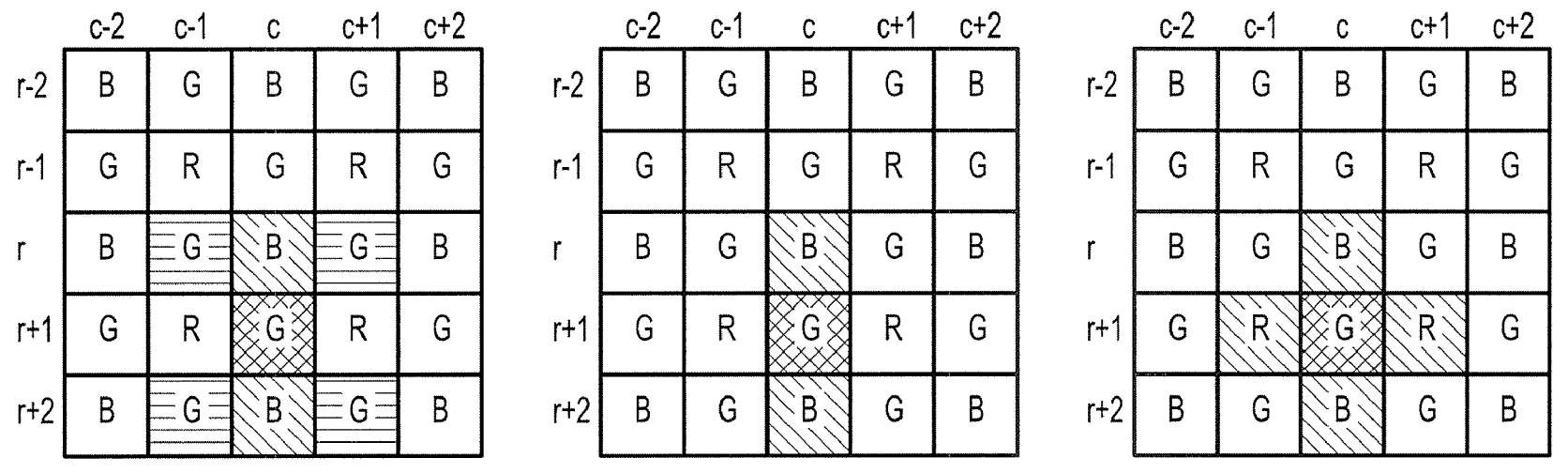

With reference to FIG. 9A, a missing blue value for a green pixel in a row comprising red and green pixels and located at row r+1 and column c, $B_{(r+1,c)}$, can be interpolated in the horizontal direction as follows:

$$G'_{(r,c)} = \frac{G_{(r,c-1)} + G_{(r,c+1)}}{2} \quad (29)$$

$$G'_{(r+2,c)} = \frac{G_{(r+2,c-1)} + G_{(r+2,c+1)}}{2} \quad (30)$$

$$B_{(r+1,c)} = G_{(r+1,c)} + \frac{B_{(r,c)} - G'_{(r,c)} + B_{(r+2,c)} - G'_{(r+2,c)}}{2} \quad (31)$$

With reference to FIG. 9B, a missing blue value for a green pixel in a row comprising red and green pixels and located at row r+1 and column c, $B_{(r+1,c)}$, can be interpolated in the vertical direction as follows:

$$B_{(r+1,c)} = \frac{B_{(r,c)} + B_{(r+2,c)}}{2} \quad (32)$$

With reference to FIG. 9C, a missing blue value for a green pixel in a row comprising red and green pixels and located at row r+1 and column c, $B_{(r+1,c)}$, can be interpolated in a hybrid horizontal and vertical direction as follows:

$$B_{(r+1,c)} = \frac{B_{(r,c)} + B_{(r+2,c)} + B'_{(r+1,c-1)} + B'_{(r+1,c+1)}}{4} \quad (33)$$

The intermediate blue values $B'_{(r+1,c-1)}$ and $B'_{(r+1,c+1)}$ can be computed with according to formulas (14) and (15) above.

Figures 10A, 10B, 10C:
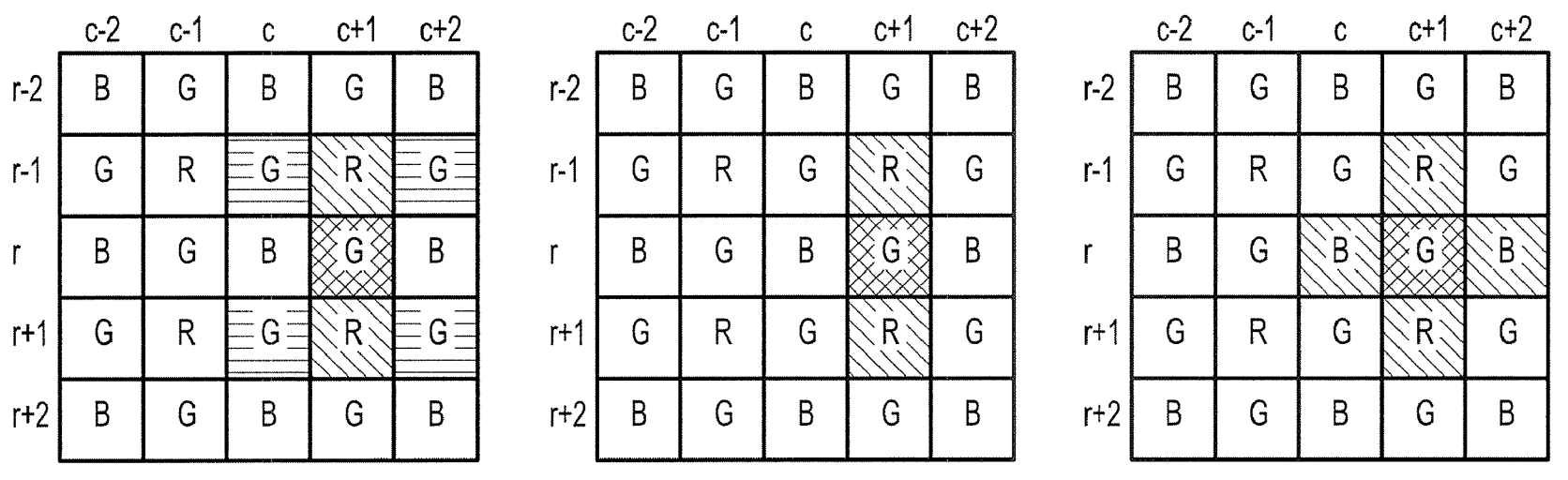

With reference to FIG. 10A, a missing red value for a green pixel in a row comprising blue and green pixels and located at row r and column c+1, $R_{(r,c+1)}$, can be interpolated in the horizontal direction as follows:

$$G'_{(r-1,c+1)} = \frac{G_{(r-1,c)} + G_{(r-1,c+2)}}{2} \quad (34)$$

$$G'_{(r+1,c+1)} = \frac{G_{(r+1,c)} + G_{(r+1,c+2)}}{2} \quad (35)$$

$$R_{(r,c+1)} = G_{(r,c+1)} + \frac{R_{(r-1,c+1)} - G'_{(r-1,c+1)} + R_{(r+1,c+1)} - G'_{(r+1,c+1)}}{2} \quad (36)$$

With reference to FIG. 10B, a missing red value for a green pixel in a row comprising blue and green pixels and located at row r and column c+1, $R_{(r,c+1)}$ can be interpolated in the vertical direction as follows:

$$R_{(r,c+1)} = \frac{R_{(r-1,c+1)} + R_{(r+1,c+1)}}{2} \quad (37)$$

With reference to FIG. 10C, a missing red value for a green pixel in a row comprising blue and green pixels and located at row r and column c+1, $R_{(r,c+1)}$, can be interpolated in a hybrid horizontal and vertical direction as follows:

$$R_{(r,c+1)} = \frac{R_{(r-1,c+1)} + R_{(r+1,c+1)} + R'_{(r,c)} + R'_{(r,c+2)}}{4} \quad (38)$$

Figures 11A, 11B:
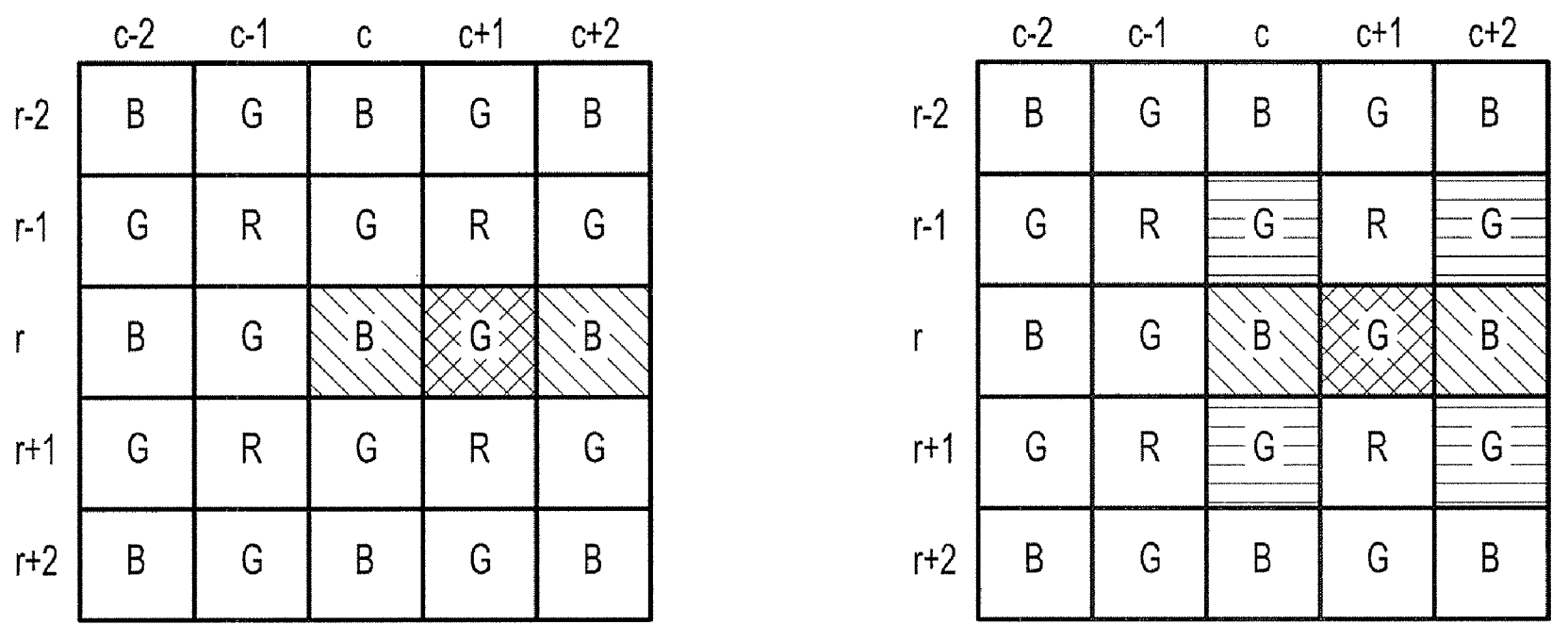

With reference to FIG. 11A, a missing blue value for a green pixel in a row comprising blue and green pixels and located at row r and column c+1, $R_{(r,c+1)}$, can be interpolated in the horizontal direction as follows:

$$B_{(r,c+1)} = \frac{B_{(r,c)} + B_{(r,c+2)}}{2} \quad (39)$$

With reference to FIG. 11B, a missing blue value for a green pixel in a row comprising blue and green pixels and located at row r and column c+1, $R_{(r,c+1)}$, can be interpolated in the vertical direction as follows:

$$G'_{(r,c)} = \frac{G_{(r-1,c)} + G_{(r+1,c)}}{2} \quad (40)$$

$$G'_{(r,c+2)} = \frac{G_{(r-1,c+2)} + G_{(r+1,c+2)}}{2} \quad (41)$$

$$B_{(r,c+1)} = G_{(r,c+1)} + \frac{B_{(r,c)} - G'_{(r,c)} + R_{(r,c+2)} - G'_{(r,c+2)}}{2} \quad (42)$$

When a blue value of a green pixel in a row comprising blue and green pixels is to be interpolated in a hybrid horizontal and vertical direction (i.e., when the neighbors of the subject green pixel are interpolated in different directions), the blue value can be interpolated according to formulas (40), (41), and (42) above.

As indicated above, demosaiced color pixel values sometimes do not accurately reflect the true color in a corresponding part of a scene. For example, a pixel corresponding to the edge of a white region in a scene might appear colored rather than white. Digital image processing can be used to correct such errors, which are also referred to as "color artifacts." "Chroma blurring"—combining the color values of a subject pixel with color values of adjacent pixels—is one technique for reducing false color artifacts.

A hardware-efficient chroma blurring technique will now be described with reference to FIG. 12. In a disclosed embodiment, the chroma blurring technique can be implemented in an imager having as few as three rows of buffer memory. Because the disclosed embodiment requires pixel values for each color channel (i.e., a red value, a green value, and a blue value, assuming operation in the Bayer domain), chroma blurring is typically performed after demosaicing.

Three average pixel values—$\overline{R}_{(r,c)}$, $\overline{G}_{(r,c)}$, and $\overline{B}_{(r,c)}$—are computed for a subject pixel at row r and column c with reference to adjacent pixels in the same row as follows:

$$\overline{R}_{(r,c)} = \frac{R_{(r,c-1)} + R_{(r,c)} + R_{(r,c+1)}}{3} \quad (43)$$

$$\overline{G}_{(r,c)} = \frac{G_{(r,c-1)} + G_{(r,c)} + G_{(r,c+1)}}{3} \quad (44)$$

$$\overline{B}_{(r,c)} = \frac{B_{(r,c-1)} + B_{(r,c)} + B_{(r,c+1)}}{3} \quad (45)$$

Figure 12:
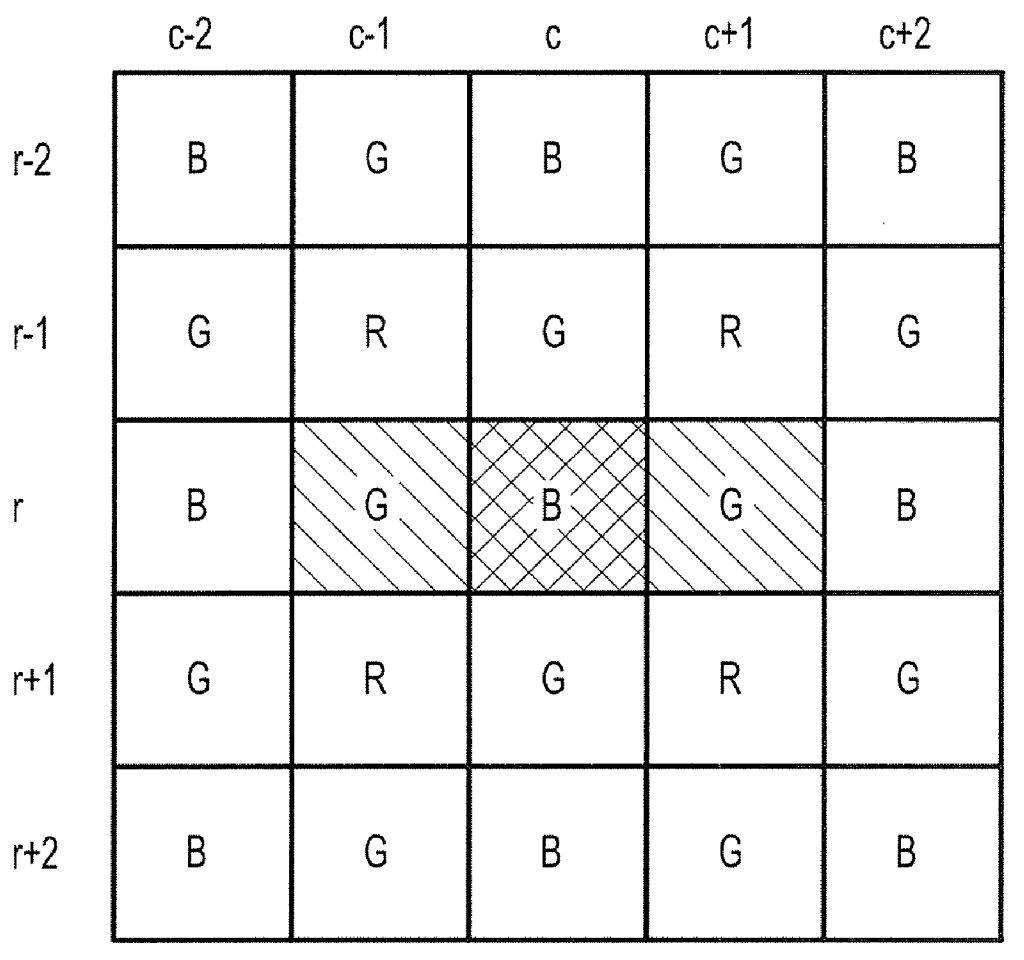

In FIG. 12, the subject pixel is shaded with a crisscross pattern and the adjacent pixels whose values are referenced in formulas (43), (44), and (45) are shaded with diagonal lines.

$\overline{R}_{(r,c)}$ is the average of red pixel values of the subject pixel and adjacent pixels. $\overline{G}_{(r,c)}$ is the average of green pixel values of the subject pixel and adjacent green pixels. $\overline{B}_{(r,c)}$ is the average of blue pixel values of the subject pixel and adjacent pixels.

The intermediate values $\overline{R}_{(r,c)}$, $\overline{G}_{(r,c)}$, and $\overline{B}_{(r,c)}$ are then converted to the $YC_bC_r$ color domain as follows:

$$Y_{(r,c)} = \frac{R_{(r,c)}}{4} + \frac{G_{(r,c)}}{2} + \frac{B_{(r,c)}}{4} \quad (46)$$

$$C_{b_{(r,c)}} = \overline{B}_{(r,c)} - \overline{G}_{(r,c)} \quad (47)$$

$$C_{r_{(r,c)}} = \overline{R}_{(r,c)} - \overline{G}_{(r,c)} \quad (48)$$

Replacement red, green, and blue values for the subject pixel can then be derived from the $YC_bC_r$ color domain values as follows:

$$R'_{(r,c)} = Y_{(r,c)} + \frac{3}{4}C_{r_{(r,c)}} - \frac{1}{4}C_{b_{(r,c)}} \quad (49)$$

$$G'_{(r,c)} = Y_{(r,c)} - \frac{1}{4}C_{r_{(r,c)}} - \frac{1}{4}C_{b_{(r,c)}} \quad (50)$$

$$B'_{(r,c)} = Y_{(r,c)} - \frac{1}{4}C_{r_{(r,c)}} + \frac{3}{4}C_{b_{(r,c)}} \quad (51)$$

The replacement red, green, and blue values—$R'_{(r,c)}$, $G'_{(r,c)}$, and $B'_{(r,c)}$ respectively—are substituted for the original red, green, and blue values associated with the subject pixel. Replacement color values for all or substantially all pixels in an entire digital image or a region thereof can be computed similarly to reduce color artifacts over a larger portion of the image.

Figure 13:
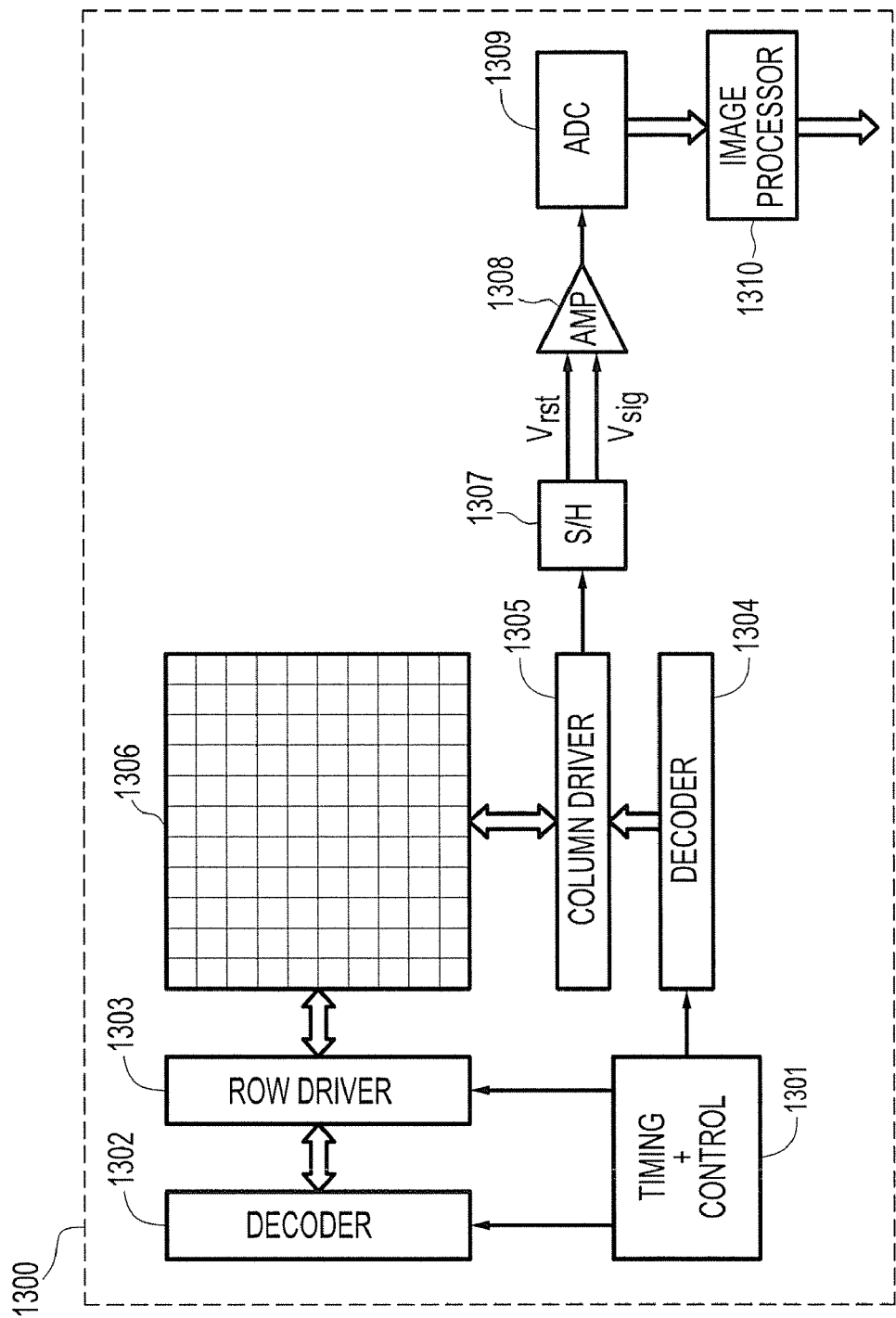
FIG. 13 is a partial top-down block diagram of an imager and associated read-out circuitry constructed in accordance with a disclosed embodiment.

The following paragraphs describe how to implement embodiments of the disclosure in an imager and a processor system. FIG. 13 illustrates a partial top-down block diagram view an imager 1300 and associated read-out circuitry constructed in accordance with an embodiment disclosed herein. Although FIG. 13 illustrates a CMOS imager and associated read-out circuitry, embodiments may employ other types of imagers, for example a CCD imager.

When the imager 1300 is operated to capture light, the pixel cells in each row of pixel array 1306 are all turned on at the same time by a row select line, and the signals of the pixel cells of each column are selectively output onto output lines by respective column select lines. A plurality of row and column select lines are provided for the array. The row lines are selectively activated in sequence by a row driver 1303 in response to a row address decoder 1302 and the column select lines are selectively activated in sequence for each row activation by a column driver 1305 in response to a column address decoder 1304. Thus, row and column addresses are provided for each pixel cell of the pixel array 1306. The imager 1300 is operated by the timing and control circuit 1301, which controls the address decoders 1302, 1304 for selecting the appropriate row and column select lines for pixel cell read-out, and row and the column drivers 1303, 1305, which apply driving voltage to the drive transistors of the selected row and column lines.

In a CMOS imager, the pixel cell output signals typically include a pixel reset signal $V_{rst}$ taken off of a floating diffusion region (via a source follower transistor) when it is reset and a pixel image signal $V_{sig}$, which is taken off the floating diffusion region (via the source follower transistor) after charges generated by an image are transferred to it. The $V_{rst}$ and $V_{sig}$ signals for each pixel of pixel array 1306 are read by a sample and hold circuit 1307 and are subtracted by a differential amplifier 1308 that produces a difference signal ($V_{rst}-V_{sig}$) for each pixel cell of pixel array 1306, which represents the amount of light impinging on the pixel cell. This signal difference is digitized by an analog-to-digital converter (ADC) 1309. The digitized pixel signals are then fed to an image processor 1310 which processes the pixel signals and forms a digital image output. It is also possible to have separate driver and read-out circuits for each sub-array with the pixel output signal from the ADC 1309 of each sub-array feeding into a common image processor circuit 1310. As depicted in FIG. 13, the imager 1300 is formed on a single semiconductor chip, although other configurations are possible, as known in the art.

Image processor circuit 1310 may be constructed as a hardware circuit with associated memory, or as a programmed processor with associated memory, or as a combination of a hardware circuit and a programmed processor with associated memory. The memory can include a line buffer memory configured to read in and out pixel data in a row-wise fashion (i.e., one row at a time) during demosaicing. In a preferred embodiment, the memory is a three line buffer memory. In one embodiment, the image processor circuit 1310 is a pixel signal pipeline hardware processing circuit configured to implement demosaicing and color artifact reduction in accordance with embodiments disclosed herein. Other configurations are possible, however. For example, color artifact reduction might be not be performed in the pixel processing pipeline but rather by a central processing unit (CPU) 1404 connected to the imager 1300 by a bus 1403, as shown in FIG. 14, or by a standalone computer that receives an image from imager 1300 via a communications medium (e.g., a portable memory device or a data communications network).

Figure 14:
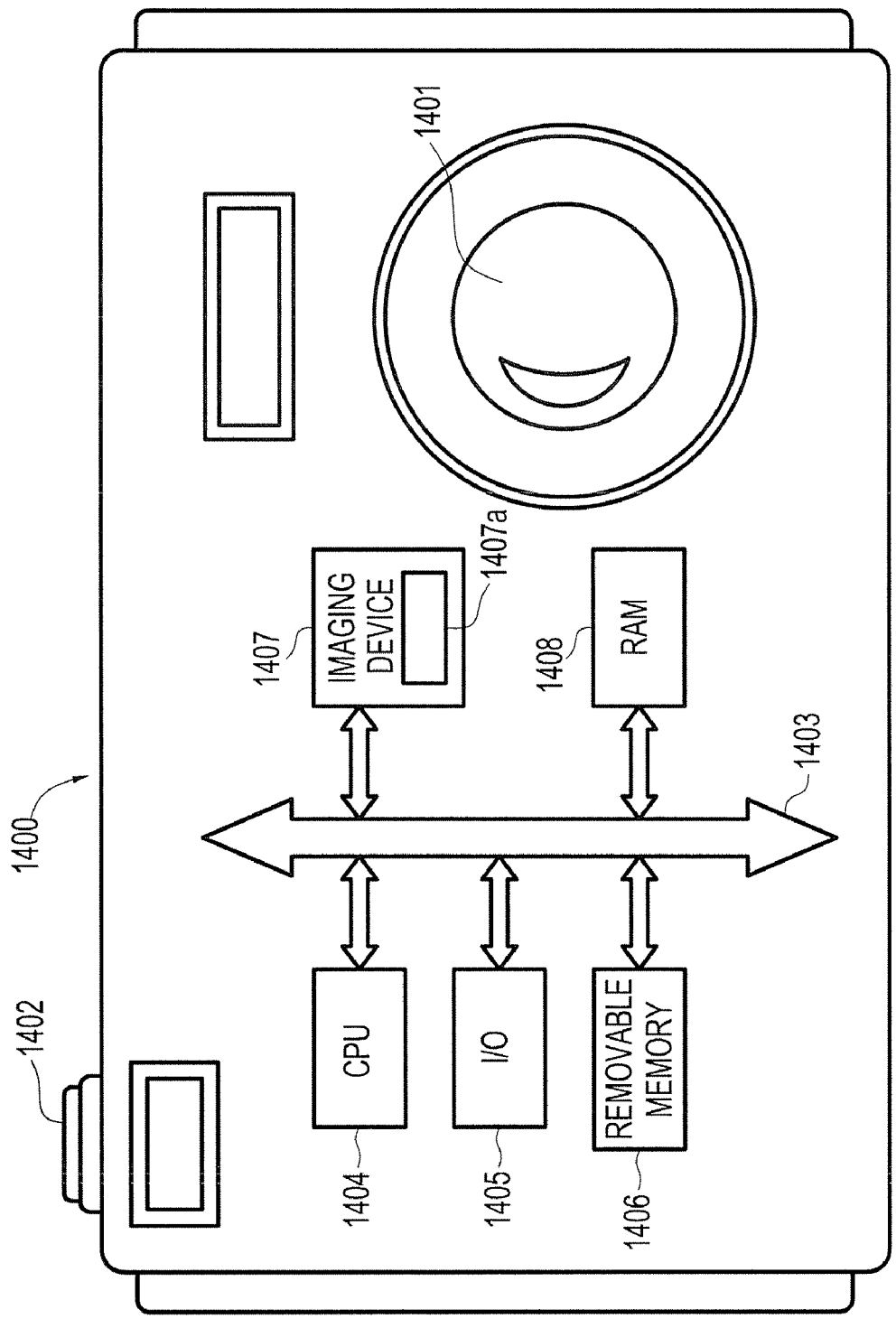
FIG. 14 illustrates a processor system constructed in accordance with a disclosed embodiment.

FIG. 14 shows a typical processor system 1400, such as, for example, a digital camera. The system 1400 includes a CPU 1404 configured to control system functions and data flow. Without being limiting, such a system could also be a personal computer or workstation, camera, scanner, machine vision, vehicle navigation system, video phone, surveillance system, auto focus system, star tracker system, motion detection system, image stabilization system, or any other system able to implement the disclosed embodiments.

In one embodiment in which the system 1400 is a digital camera, the system 1400 includes a lens 1401 for focusing an image on a pixel array 1407a of an imaging device 1407 when a shutter release button 1402 is pressed. In a disclosed embodiment, an image processor (e.g., image processor 1310 of FIG. 13) within the imaging device 1407 is configured to implement demosaicing and/or color artifact reduction as described above. System 1400 also comprises the CPU 1404, such as a microprocessor that controls camera functions and data flow, and communicates with an input/output (I/O) device 1405 over a bus 1403. The imager 1407 of device 1400 also communicates with the CPU 1404 over the bus 1403. The processor system 1400 also includes random access memory (RAM) 1408, and can include removable memory 1406, such as flash memory, which also communicates with the CPU 1404 over the bus 1403. The imaging device 1407 may be combined with the CPU 1404, with or without memory storage on a single integrated circuit or on a different chip than the CPU.

In another embodiment, the system 1400 is a personal computer comprising a CPU 1404, which communicates with an I/O device 1405 and RAM 1408 over a bus 1403. In this embodiment, the system 1400 does not necessarily include an imaging device 1407. Rather, digital pixel values are transferred from another device, for example a digital camera, via any communications medium, for example by the I/O device 1405. The digital pixel values may be in the form of a RAW image file generated by a digital camera or any other suitable image format, such as, for example, Tagged Image File Format (TIFF). The I/O device might be, for example, a USB port, a memory card reader, a network port, a parallel port, a serial port, a FireWire port, a floppy disk drive, an optical disk drive, or a wireless transceiver. Once loaded in a memory, for example RAM 1408 or possibly non-volatile storage such as a hard drive (not shown), the CPU 1404 can perform demosaicing and color artifact reduction in accordance with the embodiments disclosed herein. The resulting image might then be saved in a memory, for example removable memory 1406 or RAM 1408, output via an output device (not shown), for example a photo printer, posted on the Internet, or manipulated further by software, such as, for example, Adobe® Photoshop®. Indeed, software such as Adobe® Photoshop® may be configured to implement the disclosed embodiments by, for example, a plug-in program module or by programming a filter or macro.

While embodiments have been described in detail in connection with the examples known at the time, it should be readily understood that they are not limited to such disclosed embodiments. Rather, they can be modified to incorporate any number of variations, alterations, substitutions, or equivalent arrangements not heretofore described. Accordingly, the claimed invention is not to be seen as limited by the foregoing description, but is only limited by the scope of the attached claims.

The invention claimed is:

1. A method of determining a missing color value associated with a subject pixel in digital image data derived from a Bayer-patterned pixel array, the method comprising:

computing a horizontal gradient score, a horizontal chroma score, a vertical gradient score, and a vertical chroma score associated with the subject pixel;

adding the horizontal gradient score to the horizontal chroma score to yield a combined horizontal score, and adding the vertical gradient score to the vertical chroma score to yield a combined vertical score;

comparing the combined horizontal score to the combined vertical score to determine an interpolation direction; and determining the missing color value by interpolating in the interpolation direction, wherein the subject pixel is a native red pixel, the horizontal gradient score, $D_{h_{(r+1,c+1)}}$, is computed as follows:

$$D_{h_{(r+1,c+1)}} = |B_{(r,c)} - B_{(r,c+2)}| + |B_{(r+2,c)} - B_{(r+2,c+2)}| + |G_{(r+1,c)} - G_{(r+1,c+2)}|$$

and the vertical gradient score, $D_{v_{(r+1,c+1)}}$, is computed as follows:

$$D_{v_{(r+1,c+1)}} = |B_{(r,c)} - B_{(r+2,c)}| + |B_{(r,c+2)} - B_{(r+2,c+2)}| + |G_{(r,c+1)} - G_{(r+2,c+1)}|$$

wherein B represents the blue value associated with the pixel located at the row and column indicated in the subscript, and G represents the green value associated with the pixel located at the row and column indicated in the subscript.

2. The method of claim 1, wherein the missing color value is a green value, $G_{(r+1,c+1)}$, computed as follows:

$$G_{(r+1,c+1)} = \begin{cases} \frac{G_{(r+1,c)} + G_{(r+1,c+2)}}{2} & \text{if } D'_{h_{(r+1,c+1)}} < D'_{v_{(r+1,c+1)}} \\ \frac{G_{(r,c+1)} + G_{(r+2,c+1)}}{2} & \text{if } D'_{h_{(r+1,c+1)}} > D'_{v_{(r+1,c+1)}} \\ \frac{G_{(r+1,c)} + G_{(r+1,c+2)} + G_{(r,c+1)} + G_{(r+2,c+1)}}{4} & \text{if } D'_{h_{(r+1,c+1)}} = D'_{v_{(r+1,c+1)}} \end{cases}$$

wherein G represents the green value associated with the pixel located at the row and column indicated in the subscript, $D'_{h_{(r+1,c+1)}}$ represents the combined horizontal score and $D'_{v_{(r+1,c+1)}}$ represents the combined vertical score.

3. The method of claim 1, wherein the horizontal combined score equals the vertical combined score, and the missing color value is a blue value, $B_{(r+1,c+1)}$, computed as follows:

$$B_{(r+1,c+1)} = \frac{(B_{(r,c)} + B_{(r,c+2)} + B_{(r+2,c)} + B_{(r+2,c+2)})}{4}$$

wherein B represents the blue value associated with the pixel located at the row and column indicated in the subscript.

4. A method of determining a missing color value associated with a subject pixel in digital image data derived from a Bayer-patterned pixel array, the method comprising:
   computing a horizontal gradient score, a horizontal chroma score, a vertical gradient score, and a vertical chroma score associated with the subject pixel;
   adding the horizontal gradient score to the horizontal chroma score to yield a combined horizontal score, and adding the vertical gradient score to the vertical chroma score to yield a combined vertical score;
   comparing the combined horizontal score to the combined vertical score to determine an interpolation direction; and
   determining the missing color value by interpolating in the interpolation direction, wherein subject pixel is a native red pixel, the horizontal chroma score, $K_{h_{(r+1,c+1)}}$, is computed as follows:

$$K_{h_{(r+1,c+1)}} = \left| \frac{G_{(r+1,c+2)} + G_{(r+1,c)}}{2} - R_{(r+1,c+1)} \right|$$

and the vertical chroma score, $K_{v_{(r+1,c+1)}}$, is computed as follows:

$$K_{v_{(r+1,c+1)}} = \left| \frac{G_{(r+2,c+1)} + G_{(r,c+1)}}{2} - R_{(r+1,c+1)} \right|$$

wherein G represents the green value associated with the pixel located at the row and column indicated in the subscript, and R represents the red value associated with the pixel located at the row and column indicated in the subscript.

5. A method of determining a missing color value associated with a subject pixel in digital image data derived from a Bayer-patterned pixel array, the method comprising:
   computing a horizontal gradient score, a horizontal chroma score, a vertical gradient score, and a vertical chroma score associated with the subject pixel;
   adding the horizontal gradient score to the horizontal chroma score to yield a combined horizontal score, and adding the vertical gradient score to the vertical chroma score to yield a combined vertical score;
   comparing the combined horizontal score to the combined vertical score to determine an interpolation direction; and
   determining the missing color value by interpolating in the interpolation direction, wherein the subject pixel is a native red pixel, the interpolation direction is horizontal, and the missing color value is a blue value, $B_{(r+1,c+1)}$, computed as follows:

$$B_{(r+1,c+1)} = G_{(r+1,c+1)} + \frac{B'_{(r,c+1)} - G_{(r,c+1)} + B'_{(r+2,c+1)} - G_{(r+2,c+1)}}{2}$$

$$B'_{(r,c+1)} = \frac{B_{(r,c)} + B_{(r,c+2)}}{2}$$

$$B'_{(r+2,c+1)} = \frac{B_{(r+2,c)} + B_{(r+2,c+2)}}{2}$$

wherein G represents the green value associated with the pixel located at the row and column indicated in the subscript, and B represents the blue value associated with the pixel located at the row and column indicated in the subscript.

6. A method of determining a missing color value associated with a subject pixel in digital image data derived from a Bayer-patterned pixel array, the method comprising:
   computing a horizontal gradient score, a horizontal chroma score, a vertical gradient score, and a vertical chroma score associated with the subject pixel;
   adding the horizontal gradient score to the horizontal chroma score to yield a combined horizontal score, and adding the vertical gradient score to the vertical chroma score to yield a combined vertical score;
   comparing the combined horizontal score to the combined vertical score to determine an interpolation direction; and
   determining the missing color value by interpolating in the interpolation direction, wherein the subject pixel is a native red pixel, the interpolation direction is vertical, and the missing color value is a blue value, $B_{(r+1,c+1)}$, computed as follows:

$$B_{(r+1,c+1)} = G_{(r+1,c+1)} + \frac{B'_{(r+1,c)} - G_{(r+1,c)} + B'_{(r+1,c+2)} - G_{(r+1,c+2)}}{2}$$

$$B'_{(r+1,c)} = \frac{B_{(r,c)} + B_{(r+2,c)}}{2}$$

$$B'_{(r+1,c+2)} = \frac{B_{(r,c+2)} + B_{(r+2,c+2)}}{2}$$

wherein G represents the green value associated with the pixel located at the row and column indicated in the subscript, and B represents the blue value associated with the pixel located at the row and column indicated in the subscript.

7. A method of determining a missing color value associated with a subject pixel in digital image data derived from a Bayer-patterned pixel array, the method comprising:
   computing a horizontal gradient score, a horizontal chroma score, a vertical gradient score, and a vertical chroma score associated with the subject pixel;
   adding the horizontal gradient score to the horizontal chroma score to yield a combined horizontal score, and adding the vertical gradient score to the vertical chroma score to yield a combined vertical score;
comparing the combined horizontal score to the combined vertical score to determine an interpolation direction; and
determining the missing color value by interpolating in the interpolation direction, wherein the subject pixel is a native green pixel in a row comprising native red and green pixels, green values for immediately adjacent pixels in the same row as the subject pixel were interpolated horizontally, and the missing color value is a blue value, $B_{(r+1,c)}$, computed as follows:

$$G'_{(r,c)} = \frac{G_{(r,c-1)} + G_{(r,c+1)}}{2}$$

$$G'_{(r+2,c)} = \frac{G_{(r+2,c-1)} + G_{(r+2,c+1)}}{2}$$

$$B_{(r+1,c)} = G_{(r+1,c)} + \frac{B_{(r,c)} - G'_{(r,c)} + B_{(r+2,c)} - G'_{(r+2,c)}}{2}$$

wherein G represents the green value associated with the pixel located at the row and column indicated in the subscript, and B represents the blue value associated with the pixel located at the row and column indicated in the subscript.

8. A method of determining a missing color value associated with a subject pixel in digital image data derived from a Bayer-patterned pixel array, the method comprising:
computing a horizontal gradient score, a horizontal chroma score, a vertical gradient score, and a vertical chroma score associated with the subject pixel;
adding the horizontal gradient score to the horizontal chroma score to yield a combined horizontal score, and adding the vertical gradient score to the vertical chroma score to yield a combined vertical score;
comparing the combined horizontal score to the combined vertical score to determine an interpolation direction;
determining the missing color value by interpolating in the interpolation direction;
replacing the color values associated with the subject pixel, $R_{(r,c)}$, $G_{(r,c)}$, $B_{(r,c)}$, with adjusted color values $R'_{(r,c)}$, $G'_{(r,c)}$, $B'_{(r,c)}$, computed as follows:

$$\overline{R}_{(r,c)} = \frac{R_{(r,c-1)} + R_{(r,c)} + R_{(r,c+1)}}{3}$$

$$\overline{G}_{(r,c)} = \frac{G_{(r,c-1)} + G_{(r,c)} + G_{(r,c+1)}}{3}$$

$$\overline{B}_{(r,c)} = \frac{B_{(r,c-1)} + B_{(r,c)} + B_{(r,c+1)}}{3}$$

$$Y_{(r,c)} = \frac{R_{(r,c)}}{4} + \frac{G_{(r,c)}}{2} + \frac{B_{(r,c)}}{4}$$

$$C_{b(r,c)} = \overline{B}_{(r,c)} - \overline{G}_{(r,c)}$$

$$C_{r(r,c)} = \overline{R}_{(r,c)} - \overline{G}_{(r,c)}$$

$$R'_{(r,c)} = Y_{(r,c)} + \frac{3}{4}C_{r(r,c)} - \frac{1}{4}C_{b(r,c)}$$

$$G'_{(r,c)} = Y_{(r,c)} - \frac{1}{4}C_{r(r,c)} - \frac{1}{4}C_{b(r,c)}$$

$$B'_{(r,c)} = Y_{(r,c)} - \frac{1}{4}C_{r(r,c)} + \frac{3}{4}C_{b(r,c)}$$

wherein R represents the red value associated with the pixel located at the row and column indicated in the subscript, B represents the blue value associated with the pixel located at the row and column indicated in the subscript, and G represents the green value associated with the pixel located at the row and column indicated in the subscript.

* * * * *